United States Patent
Zhen et al.

(10) Patent No.: US 10,921,635 B2
(45) Date of Patent: Feb. 16, 2021

(54) DISPLAY SUBSTRATE, MANUFACTURING METHOD THEREOF, DISPLAY DEVICE AND MASK

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Long Zhen, Beijing (CN); Heewoong Kim, Beijing (CN); Mingqian Hao, Beijing (CN); Jianjun Li, Beijing (CN); Chunlong Yan, Beijing (CN); Zecheng Li, Beijing (CN); Qiang Li, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 108 days.

(21) Appl. No.: 16/244,715

(22) Filed: Jan. 10, 2019

(65) Prior Publication Data
US 2019/0302550 A1    Oct. 3, 2019

(30) Foreign Application Priority Data
Mar. 28, 2018  (CN) .......................... 201810266626.5

(51) Int. Cl.
G02F 1/1335 (2006.01)
G02F 1/1362 (2006.01)

(52) U.S. Cl.
CPC .................. *G02F 1/133514* (2013.01); *G02F 2001/136222* (2013.01)

(58) Field of Classification Search
None
See application file for complete search history.

(56) References Cited

U.S. PATENT DOCUMENTS

| | | | | |
|---|---|---|---|---|
| 6,307,606 B1* | 10/2001 | Takii | ................. | G02F 1/133514 349/106 |
| 2003/0160916 A1* | 8/2003 | Nakagawa | ........ | G02F 1/133514 349/106 |
| 2015/0253620 A1* | 9/2015 | Yang | ................. | G02F 1/133512 349/106 |

FOREIGN PATENT DOCUMENTS

| | | |
|---|---|---|
| CN | 105652506 A | 6/2016 |
| CN | 106226926 A | 12/2016 |

(Continued)

OTHER PUBLICATIONS

First Office Action for Chinese Application No. 201810266626.5, dated Jul. 3, 2020, 6 Pages.

*Primary Examiner* — Thanh Nhan P Nguyen
(74) *Attorney, Agent, or Firm* — Brooks Kushman P.C.

(57) ABSTRACT

The present disclosure provides a display substrate, including a base substrate, and a black matrix pattern and a color filter pattern on the base substrate. The black matrix pattern defines one or more display regions of the display substrate and a non-display region surrounding the one or more display regions. The color filter pattern includes a plurality of color filter sub-patterns, each color filter sub-pattern includes a plurality of color filter units, and each color filter unit includes a body portion. At least one of the color filter units further includes an anchoring portion extending from the body portion, and in a direction perpendicular to an extension direction of the body portion, the anchoring portion has a size greater than the body portion. The present disclosure further provides a method for manufacturing the display substrate, a display device and a mask.

18 Claims, 7 Drawing Sheets

(56) References Cited

FOREIGN PATENT DOCUMENTS

| KR | 20090054841 A | 6/2009 |
|----|---------------|--------|
| KR | 20120071745 A | 7/2012 |

* cited by examiner

DISPLAY SUBSTRATE, MANUFACTURING METHOD THEREOF, DISPLAY DEVICE AND MASK

CROSS-REFERENCE TO RELATED APPLICATION

This present application claims priority to Chinese Patent Application No. 201810266626.5 filed on Mar. 28, 2018, which is incorporated herein by reference in its entirety.

TECHNICAL FIELD

The present disclosure relates to the field of display technology, in particular to a display substrate, a manufacturing method thereof, a display device and a mask.

BACKGROUND

Currently, Liquid Crystal Displays (LCDs) and Organic Light-Emitting Diode (OLED) display devices are the most popular flat-panel display devices. For LCDs and parts of the OLED display devices, a functionality of color display is achieved through filtering of color filters. Typically, LCD includes a display substrate and an opposed substrate which are oppositely arranged to form a cell, and a liquid crystal layer arranged therebetween. The color filter may be included in the display substrate or the opposed substrate, so as to selectively allow a light beam with a specific wavelength to pass therethrough, thereby to provide three primary colors, i.e., red (R), green (G) and blue (B) and achieve the functionality of color display. Some OLED display devices also adopt the color display principle of LCD, i.e., a white light beam is emitted from an OLED and passes through the color filter so as to provide the three primary colors and achieve the color display function. Typically, the color filter is made of an organic precursor resin. When the precursor resin is formed with insufficient adhesion with a base substrate, the precursor resin may probably be removed from the base substrate, resulting in various defects in process and degraded products.

SUMMARY

In one aspect, the present disclosure provides in some embodiments a display substrate, including a base substrate, and a black matrix pattern and a color filter pattern arranged on the base substrate. The black matrix pattern defines one or more display regions of the display substrate, and a non-display region surrounding the one or more display regions. The color filter pattern includes a plurality of color filter sub-patterns, each color filter sub-pattern includes a plurality of color filter units, and each color filter unit includes a body portion. At least one of the color filter units further includes an anchoring portion extending from the body portion, and the anchoring portion has a width greater than the body portion in a direction perpendicular to an extension direction of the body portion.

In a possible embodiment of the present disclosure, the body portion of each color filter unit at the non-display region is of a strip-like shape.

In a possible embodiment of the present disclosure, at an end region of each color filter sub-pattern, the anchoring portion of the at least one color filter unit extends in the direction perpendicular to the extension direction of the body portion toward a boundary between the color filter sub-pattern where the at least one color filter unit is located and at least one adjacent color filter sub-pattern.

In a possible embodiment of the present disclosure, each color filter sub-pattern includes a first color filter unit, a second color filter unit, and a third color filter unit arranged adjacent to each other sequentially.

In a possible embodiment of the present disclosure, at the end portion of each color filter sub-pattern, the first color filter unit includes the anchoring portion.

In a possible embodiment of the present disclosure, at the end region of each color filter sub-pattern, the anchoring portion of the first color filter unit extends to a boundary between the color filter sub-pattern where the first color filter unit is located and an adjacent color filter sub-pattern away from the first color filter unit.

In a possible embodiment of the present disclosure, at the end region of each color filter sub-pattern, the third color filter unit includes the anchoring portion, and the anchoring portion of the first color filter unit and the anchoring portion of the third color filter unit extend in opposite directions and meet at an end region of the second color filter unit.

In a possible embodiment of the present disclosure, in a direction perpendicular to an extension direction of the body portion of the first color filter unit, the anchoring portion of the first color filter unit has a width equal to a sum of a width of the body portion of the first color filter unit and a half of a width of the body portion of the second color filter unit, and the anchoring portion of the third color filter unit has a width equal to a sum of a width of the body portion of the third color filter unit and a half of the width of the body portion of the second color filter unit.

In a possible embodiment of the present disclosure, at the end region of each color filter sub-pattern, the second color filter unit includes an anchoring portion which extends to a boundary between the color filter sub-pattern where the first color filter unit is located and an adjacent color filter sub-pattern away from the first color filter unit.

In a possible embodiment of the present disclosure, in the direction perpendicular to the extension direction of the body portion of the first color filter unit, the anchoring portion of the first color filter unit has a width equal to a sum of a width of the body portion of the first color filter unit, a width of the body portion of the second color filter unit and a width of the body portion of the third color filter unit.

In a possible embodiment of the present disclosure, in the direction perpendicular to the extension direction of the body portion of the first color filter unit, the anchoring portion of the second color filter unit has a width equal to a width of the body portion of the second color filter unit and a width of the body portion of the third color filter unit.

In a possible embodiment of the present disclosure, in the extension direction of the body portion of the first color filter unit, the anchoring portion of the first color filter unit has a length equal to the anchoring portion of the second color filter unit.

In a possible embodiment of the present disclosure, the display substrate further includes auxiliary black matrix patterns arranged at the non-display region and between adjacent color filter sub-patterns. The auxiliary black matrix pattern overlaps the anchoring portion of the first color filter unit, the anchoring portion of the second color filter unit, and an end of the third color filter unit.

In a possible embodiment of the present disclosure, at the end region of each color filter sub-pattern, the second color filter unit includes an anchoring portion which extends in the direction perpendicular to the extension portion of the body portion of the second color filter unit to boundaries between the color filter sub-pattern where the second color filter unit is located and each of two adjacent color filter sub-patterns.

In a possible embodiment of the present disclosure, at the end region of each color filter sub-pattern, the third color filter unit includes the anchoring portion which extends in the direction perpendicular to the extension direction of the body portion of the third color filter unit to the body portion of the second color filter unit of an adjacent color filter sub-pattern.

In a possible embodiment of the present disclosure, each color filter sub-pattern is of a centrosymmetric shape.

In a possible embodiment of the present disclosure, each color filter sub-pattern is of an axisymmetric shape.

In another aspect, the present disclosure provides in some embodiments a display device including the above-mentioned display substrate.

In yet another aspect, the present disclosure provides in some embodiments a mask for manufacturing a color filter pattern in a display substrate. An exposure pattern of the mask includes a plurality of exposure sub-patterns, and each exposure sub-pattern includes at least one exposure pattern units. Each exposure pattern unit includes a body portion and an anchoring portion at an end of the mask. The anchoring portion has a size greater than that of the body portion in a direction perpendicular to an extension direction of the body portion.

In still yet another aspect, the present disclosure provides in some embodiments a method for manufacturing a display substrate, including applying precursor resin onto a base substrate, and patterning the precursor resin through the above-mentioned mask, so as to form color filter units.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
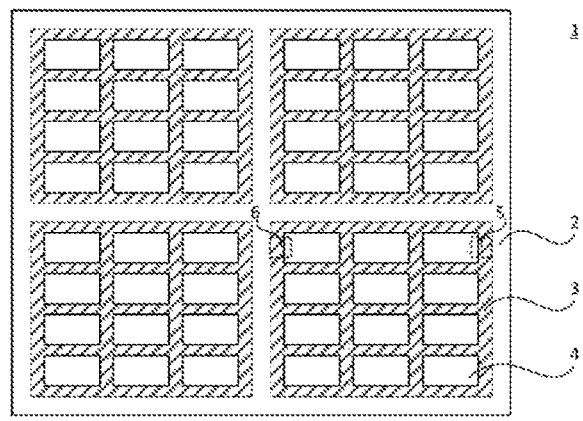
FIG. 1 is a top view of a conventional display substrate.

As shown in FIG. 1, typically a display substrate 1 includes a base substrate 2 and several patterned regions 3 on the base substrate 2. The patterned regions 3 refer to regions having patterns formed on the display substrate 1 through a same mask. In the example of FIG. 1, the display substrate 1 includes four patterned regions. In other words, when a masking process is performed through a mask, after the display substrate 1 is moved and aligned with the mask, the display substrate 1 is subjected to exposure for four times and is then developed to acquire four patterned regions 3 with the same pattern. Each patterned region 3 includes a plurality of panel regions 4.

Figure 2A:
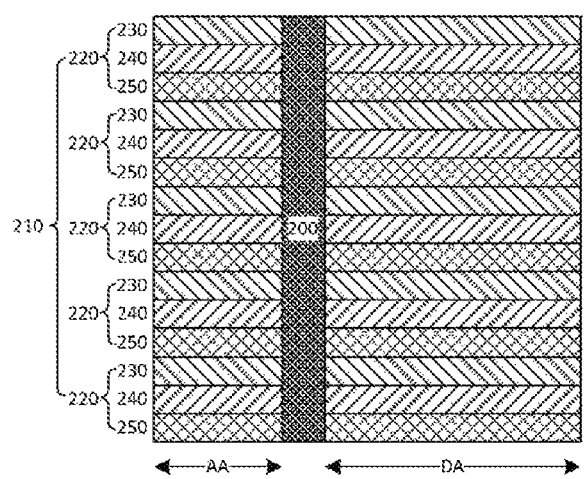
FIGS. 2A and 2B are partial enlarged views of the display substrate in FIG. 1.
Figure 2B:
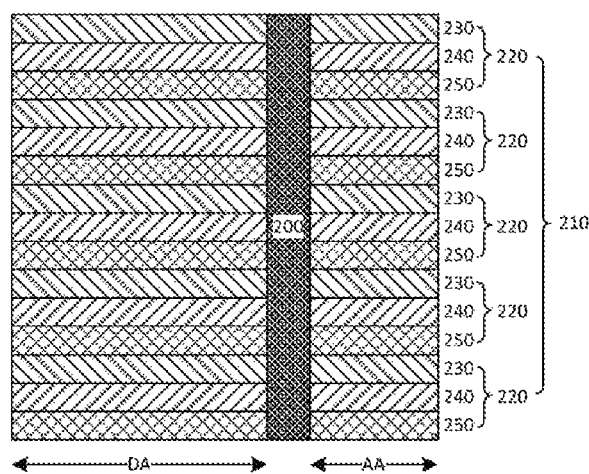

FIG. 2A shows a schematic view of a peripheral region 5 of the patterned region 3 on the display substrate 1, and FIG. 2B shows a schematic view of a peripheral region 6 of the patterned region 3 on the display substrate 1. The peripheral regions 5 and 6 refer to regions on two opposite sides of each of the patterned regions 3 formed through the same mask, i.e., two opposite end regions of each patterned region 3 (the mask, a color filter pattern or a color filter sub-pattern). Typically, the display substrate 1 includes the base substrate 2, and a black matrix pattern 200 and a color filter pattern 210 on the base substrate 2. The black matrix pattern 200 defines one or more display regions AA of the display substrate 1 and a non-display region DA (also called as peripheral region) surrounding the display regions AA. The color filter pattern 210 includes a plurality of color filter sub-patterns 220, and each color filter sub-pattern 220 includes a red color filter unit 230, a green color filter unit 240 and a blue color filter unit 250 arranged adjacent to each other sequentially.

As shown in FIGS. 2A and 2B, typically the red color filter unit 230, the green color filter unit 240 and the blue color filter unit 250 each have a strip-like shape at the peripheral region DA, and in direct contact with the base substrate 2 or the black matrix pattern 200. It is found that, precursor resin for forming the these color filter units have different adhesion levels to the base substrate 2 or the black matrix pattern 200, and some precursor resin has relatively insufficient adhesion level. When the precursor resin is treated by an air knife after a developing process, the precursor resin having insufficient adhesion level at the peripheral region DA may probably be removed, and even distributed along a direction perpendicular to the air knife. When the precursor resin of a large area has been removed, a portion of the precursor resin at the display region AA may probably be removed too, or the removed precursor resin may probably be dropped to the display region AA. In this case, the red color filter unit 230, the green color filter unit 240 and the blue color filter unit 250 at the display region AA may be adversely affected.

According to some embodiments of the present disclosure, an edge of the mask is designed in such a manner that at the peripheral regions 5, 6, a contact area of the precursor resin with the base substrate or the black matrix pattern at the peripheral region DA is increased and the adhesion level of the precursor resin to the base substrate or the black matrix pattern is increased, such that the precursor resin will not be easily removed by the air knife after developing, thereby preventing various defects in process and degraded products caused by removal of the precursor resin.

The present disclosure will be described hereinafter in conjunction with the drawings and embodiments.

Figure 3A:
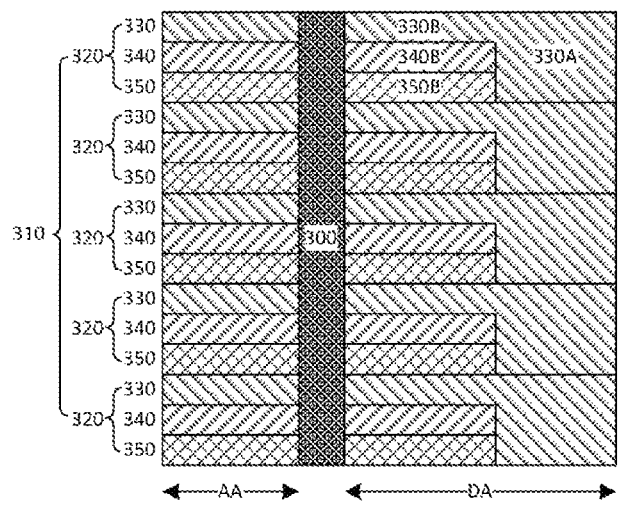
FIGS. 3A, 3B and 3C are partial enlarged views of a display substrate according to some embodiments of the present disclosure.

FIG. 3A is a partial enlarged view of a display substrate 1 according to some embodiments of the present disclosure, and illustratively shows a peripheral region 5 of a patterned region 3 of the display substrate 1. As shown in FIG. 3A, the display substrate 1 includes a base substrate 2, and a black matrix pattern 300 and a color filter pattern 310 arranged on the base substrate 2. The black matrix pattern 300 defines one or more display regions AA of the display substrate 1 and a non-display region DA surrounding the display regions AA. At each display region AA, the color filter pattern 310 includes a plurality of color filter sub-patterns 320. Each color filter sub-pattern 320 includes a first color filter unit 330, a second color filter unit 340 and a third color filter unit 350 arranged adjacent to each other sequentially.

For clarification, FIGS. 3A, 3B-3C, 4A-4B, 5A-5C, 6A-6B, 7A-7C and 8A-8C are views observed from a side of the base substrate 2 of the display substrate 1, while the base substrate 2 is omitted in these drawings.

In some embodiments of the present disclosure, the first color filter unit 330, the second color filter unit 340 and the third color filter unit 350 are a red (R) color filter unit, a green (G) color filter unit and a blue (B) color filter unit respectively, so as to allow red light beam, green light beam and blue light beam to pass therethrough respectively, thereby to achieve a functionality of color display. It should be noted that, each color filter sub-pattern 320 may also include color filter units in any other type to provide different combinations of primary colors, so as to achieve the functionality of color display. It should be further noted that, each color filter sub-pattern 320 may further include color filter units having colors other than R, G and B, i.e., it may include four color filter units. For example, in some embodiments of the present disclosure, each color filter sub-pattern 320 may include a white (W) color filter unit, a red (R)color filter unit, a green (G)color filter unit and a blue (B)color filter unit. Alternately, each color filter sub-pattern 320 may include a yellow (Y) color filter unit, a red (R) color filter unit, a green (G)color filter unit and a blue (B)color filter unit. In other words, the quantity and the types of the color filter units in each color filter sub-pattern will not be particularly defined herein.

As shown in FIG. 3A, at each display region AA, the first color filter units 330, the second color filter units 340 and the third color filter units 350 are each of a strip-like shape and arranged alternately. It should be noted that, these color filter units may also be arranged in a triangle (delta) or mosaic manner at each display region AA. Regardless of the arrangement modes of the color filter units at each display region AA, usually the color filter units each have a strip-like shape at the peripheral region DA, such that the solution in the embodiments of the present disclosure can be applied to the color filter units having various shapes and arrangement modes. In other words, the shapes and the arrangement modes of the color filter units in each color filter sub-pattern will not be particularly defined herein.

As shown in FIG. 3A, at the non-display region DA, each first color filter unit 330 includes a body portion 330B, each second color filter unit 340 includes a body portion 340B, and each third color filter unit 350 includes a body portion 350B. In other words, each color filter unit includes a body portion at the non-display region DA. In the case that a portion of each color filter unit at the display region is of a strip-like shape, the body portion of the color filter unit at the non-display region may extend in a same direction as the strip-like portion of the color filter unit at the display region. For example, the body portion 330B may extend in a same direction as a portion of the first color filter unit 330 at the display region AA.

As shown in FIG. 3A, at the non-display region DA, each first color filter unit 330 includes an anchoring portion 330A extending from the body portion 330B. The anchoring portion 330A has a size greater than the body portion 330B in a direction perpendicular to an extension direction of the body portion 330B. For example, in the direction perpendicular to the extension direction of the body portion 330B, the anchoring portion 330A may extend to a boundary between the color filter sub-pattern 320 where the first color filter unit 330 is located and an adjacent color filter sub-pattern 320. In the context of the present disclosure, the anchoring portion may not necessarily reach the boundary. For example, the anchoring portion may merely extend to the vicinity of the boundary rather than reaching the boundary. For another example, only a part of the anchoring portion may reach the boundary. In FIG. 3A, the anchoring portion 330A has a rectangular shape as a whole, and one side of the rectangle is located at the boundary. In this example, in the direction perpendicular to the extension direction of the body portion 330B, the anchoring portion 330A has a width equal to a sum of a width of the body portion 330B, a width of the body portion 340B and a width of the body portion 350B. Through the anchoring portion 330A, the first color filter unit 330 will have an increased contact area with the base substrate 2 at a right end of the patterned region 3. By means of such configuration, during the manufacture of the display substrate, a contact area of precursor resin for forming the first color filter unit 330 with the base substrate 2 at the right end of the patterned region 3 is increased, thereby to prevent the precursor resin from being removed from the base substrate 2 when subjected to an air knife after the developing process.

It should be noted that, in the context of the present disclosure, the body portion of each color filter unit at the non-display region is formed integrally with the portion at the display region. In the case that the color filter unit includes the anchoring portion at the non-display region, the body portion and the anchoring portion at the non-display region are formed integrally with the portion at the display region. The anchoring portion may be rectangular or any other shape.

In the example of FIG. 3A, the body portion of each color filter unit at the non-display region may extend in a same direction as the portion at the display region, i.e., the body portions 330B, 340B and 350B may extend in the same direction as the respective portions of the color filter units 330, 340 and 350 at the display region AA. However, in some other embodiments of the present disclosure, the extending direction of the body portions 330B, 340B and 350B and the extending direction of the respective portions of the color filter units 330, 340 and 350 at the display region AA may form an angle.

In FIG. 3A, the anchoring portion 330A is perpendicular to the body portion 330B so as to form an L shape. However, in some other embodiments of the present disclosure, the anchoring portion 330 may not be perpendicular to the body portion 330B.

Figure 3B:
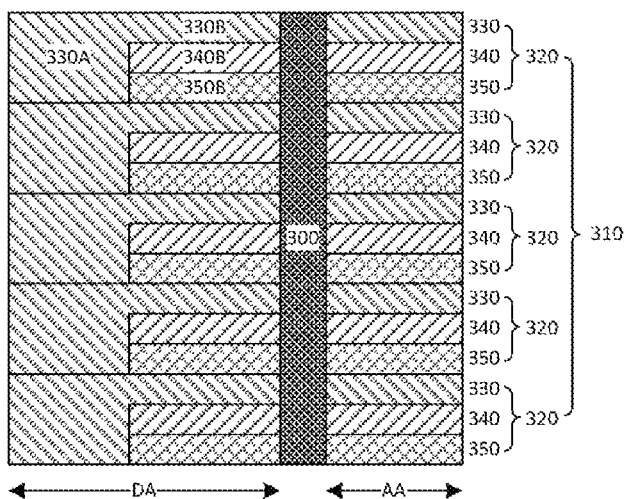

FIG. 3B illustratively shows a peripheral region 6 of the patterned region 3 on the display substrate 1. The peripheral regions 5 and 6 are peripheral regions of the same patterned region 3 which are located on opposite sides. FIG. 3A shows a layout in which five color filter sub-patterns 320 are located at the right end of the patterned region 3, while FIG. 3B shows a layout in which these color filter sub-patterns 320 are located at a left end of the pattern region 3.

As shown in FIG. 3B, at the non-display region DA, the color filter unit 330 includes the anchoring portion 330A extending from the body portion 330B. In the direction perpendicular to the extension direction of the body portion 330B, the anchoring portion 330A may extend to the boundary between the color filter sub-pattern 320 where the first color filter unit 330 is located and an adjacent color filter sub-pattern 320.

In FIGS. 3A and 3B, the first color filter unit 330 of each color filter sub-pattern 320 has an L shape at each of a left end and a right end, and the two L shapes are axisymmetric with each other. In other words, the first color filter unit 330 is of an axisymmetric shape as a whole, and each color filter sub-pattern 320 is of an axisymmetric shape too. As a result, during the manufacture of the display substrate, the precursor resin for forming the first color filter unit 330 will have an increased contact area with the base substrate 2 at the left end and the right end of the patterned region 3.

Figure 3C:
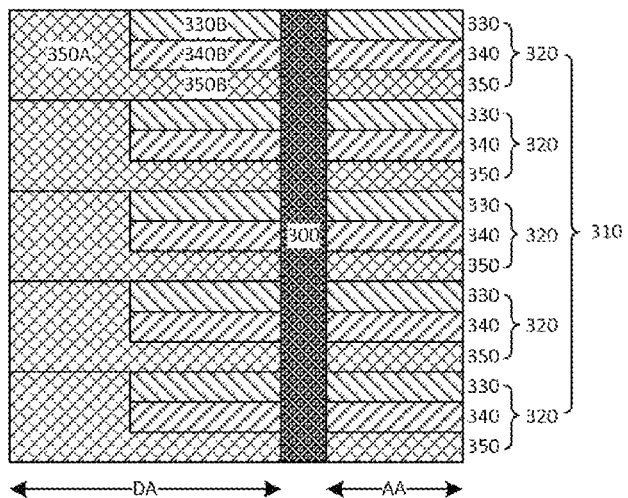

FIG. 3C illustratively shows the peripheral region 6 of the patterned region 3 on the display substrate 1, as a modified version of that in FIG. 3B. As shown in FIG. 3C, at the non-display region DA, the third color filter unit 350 includes an anchoring portion 350A extending from the body portion 350B. In a direction perpendicular to an extension direction of the body portion 350B, the anchoring portion 350A may extend to a boundary between the color filter sub-pattern 320 where the third color filter unit 350 is located and an adjacent color filter sub-pattern 320.

In the examples of FIGS. 3A and 3C, the first color filter unit 330 of each color filter sub-pattern 320 is of an L shape at the right end and the third color filter 350 is of an L shape at a left end, and the two L shapes are centrosymmetric with each other. In other words, the first color filter unit 330 is centrosymmetric with the third color filter unit 350, and each color filter sub-pattern 320 is of a centrosymmetric shape as a whole. As a result, during the manufacture of the display substrate, the precursor resin for forming the first color filter unit 330 will have an increased contact area with the base substrate 2 at the right end of the patterned region 3, and the precursor resin for forming the third color filter unit 350 will have an increased contact area with the base substrate 2 at the left end of the patterned region 3.

Figure 4A:
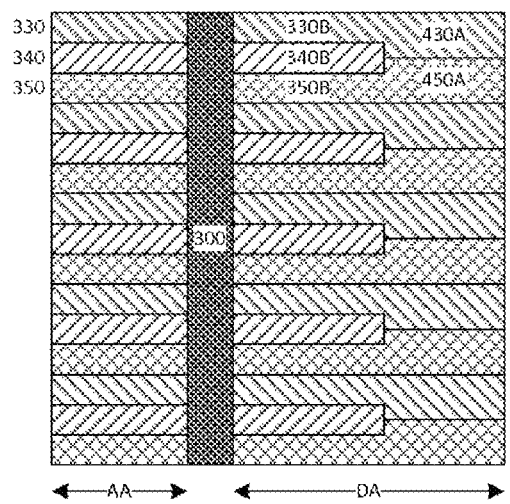
FIGS. 4A and 4B are partial enlarged views of the display substrate according to some embodiments of the present disclosure.

FIG. 4A illustratively shows the peripheral region 5 of the patterned region 3 on the display substrate 1, as a modified version of that in FIG. 3A. As shown in FIG. 4A, at the non-display region DA, the first color filter unit 330 includes an anchoring portion 430A, and the third color filter unit 350 includes an anchoring portion 450A. In the direction perpendicular to the extension direction of each of the body portions 330B and 350B, each of the anchoring portion 430A and 450A has a size greater than the corresponding of the body portions 330B and 350B. For example, in the direction perpendicular to the extension direction of each of the body portions 330B and 350B, the anchoring portion 430A and the anchoring portion 450A extend in opposite directions and meet at a right end of the second color filter unit 340.

In a possible embodiment of the present disclosure, in the direction perpendicular to the extension direction of each of the body portions 330B and 350B, the anchoring portion 430A has a width equal to a sum of the width of the body portion 330B and a half of the width of the body portion 340B, and the anchoring portion 450A has a width equal to a sum of the width of the body portion 350B and a half of the width of the body portion 340B.

By providing the anchoring portions 430A and 450A, the first color filter unit 330 and the third color filter unit 350 will have an increased contact area with the base substrate 2 at the right end of the patterned region 3. As a result, during the manufacture of the display substrate, the precursor resin for forming the first color filter unit 330 and the third color filter unit 350 will have an increased contact area with the base substrate 2 at the right end of the patterned region 3, thereby to prevent the precursor resin from being removed from the base substrate 2 when subjected to the air knife after a developing process.

Figure 4B:
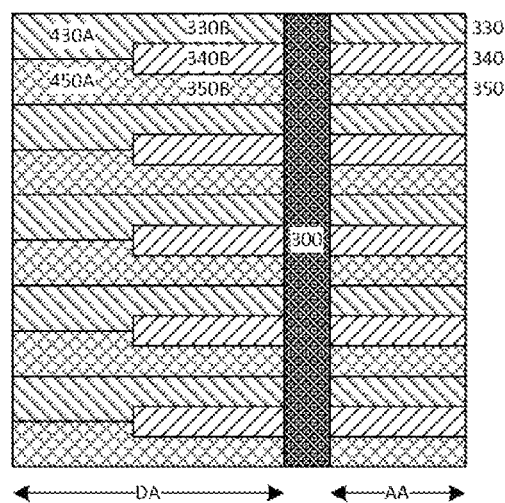

FIG. 4B illustratively shows the peripheral region 6 of the patterned region 3 on the display substrate 1. Similar to FIG. 4A, as shown in FIG. 4B, at the non-display region DA, the first color filter unit 330 includes the anchoring portion 430A and the third color filter unit 350 includes the anchoring portion 450A.

In the examples of FIGS. 4A and 4B, for each color filter sub-pattern 320, the first color filter unit 330 is of an L shape at each of a left end and a right end, and the two L shapes are axisymmetric with each other. In addition, the third color filter unit 350 is of an L shape at each of a left end and a right end, and the two L shapes are axisymmetric with each other. In other words, the first color filter unit 330 is of an axisymmetric shape as a whole, the third color filter unit 350 is of an axisymmetric shape as a whole, and each color filter sub-pattern 320 is of an axisymmetric shape too. As a result, during the manufacture of the display substrate, the precursor resin for forming the first color filter unit 330 and the third color filter unit 350 will have an increased contact area with the base substrate 2 at the left end and the right end of the patterned region 3.

Figure 5A:
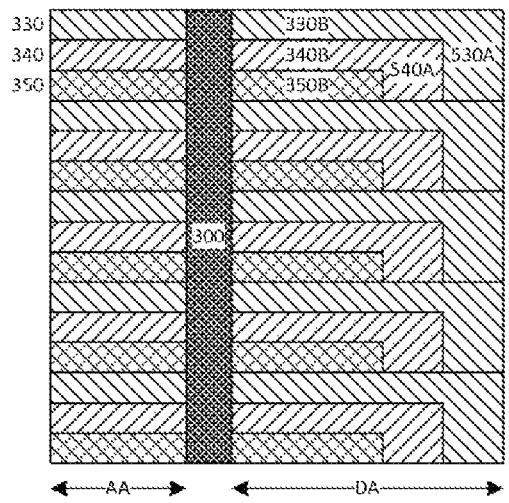
FIGS. 5A, 5B and 5C are partial enlarged views of the display substrate according to some embodiments of the present disclosure.

FIG. 5A illustratively shows the peripheral region 5 of the patterned region 3 on the display substrate 1, as a modified version of that in FIG. 3A. As shown in FIG. 5A, at the non-display region DA, the first color filter unit 330 includes an anchoring portion 530A, and the second color filter unit 340 includes an anchoring portion 540A. In the direction perpendicular to the extension direction of the body portions 330B and 340B, the anchoring portions 530A and 540A each have a size greater than a corresponding one of the body portions 330B and 340B. For example, in the direction perpendicular to the extension direction of the body portions 330B and 340B, the anchoring portions 530A and 540A may each extend to a boundary between the color filter sub-pattern 320 where the first color filter unit 330 and the second color filter unit 340 are located and an adjacent color filter sub-pattern 320.

In a possible embodiment of the present disclosure, in the direction perpendicular to the extension direction of each of the body portions 330B and 340B, the anchoring portion 530A has a width equal to a sum of the widths of the body portions 330B, 340B and 350B, and the anchoring portion 540A has a width equal to the widths of the body portions 330B and 350B. In a possible embodiment of the present disclosure, the anchoring portion 530A has a length equal to the anchoring portion 540A in the extension direction of each of the body portions 330B and 340B.

Through the anchoring portions 530A and 540A, the first color filter unit 330 and the second color filter units 340 will have an increased contact area with the base substrate 2 at the right end of the patterned region 3. As a result, during the manufacture of the display substrate, the precursor resin for forming the first color filter unit 330 and the second color filter unit 340 will have an increased contact area with the base substrate 2 at the right end of the patterned region 3, thereby to prevent the precursor resin from being removed from the base substrate 2 when subjected to an air knife after the developing process.

Figure 5B:
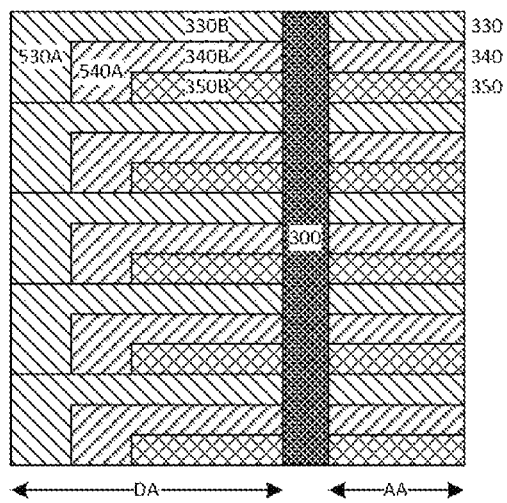

FIG. 5B illustratively shows the peripheral region 6 of the patterned region 3 on the display substrate 1. Similar to FIG. 5A, as shown in FIG. 5B, at the non-display region DA, the second color filter unit 340 includes the anchoring portion 540A, and the third color filter unit 350 includes an anchoring portion 550A.

In FIGS. 5A and 5B, for each color filter sub-pattern 320, the second color filter unit 340 is of an L shape at each of the left end and the right end, and the two L shapes are axisymmetric with each other. In addition, the first color filter unit 330 is of an L shape at the right end, and third color filter unit 350 is of an L shape at the right end too, and the two L shapes are axisymmetric with each other. In other words, the second color filter unit 330 is of a centrosymmetric shape as a whole, the first color filter unit 340 and the third color filter unit 350 are each of an axisymmetric shape, and each color filter sub-pattern 320 is of an axisymmetric shape. As a result, during the manufacture of the display substrate, the precursor resin for forming the second color filter unit 340 will have an increased contact area with the base substrate 2 at the left end and the right end of the patterned region 3.

Figure 5C:
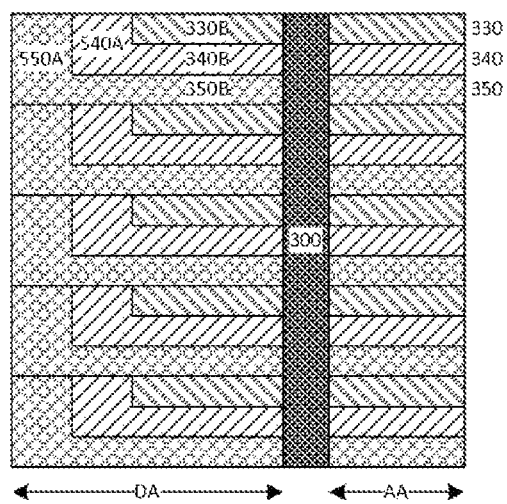

FIG. 5C illustratively shows the peripheral region of the patterned region 3 on the display substrate 1, as a modified version of that in FIG. 5B. As shown in FIG. 5C, at the non-display region DA, the third color filter unit 350 includes the anchoring portion 550A, and the second color filter unit 340 includes the anchoring portion 540A.

In FIGS. 5A and 5C, for each color filter sub-pattern 320, the first color filter unit 330 is of an L shape at the right end, the third color filter unit 350 is of an L shape at the left end, and the two L shapes are centrosymmetric with each other. In addition, the second color filter unit 340 is of an L shape at each of the left end and the right end, and the two L shapes are centrosymmetric with each other. In other words, the first color filter unit 330 and the third color filter unit 350 are centrosymmetric with each other, the second color filter unit 340 is of a centrosymmetric shape as a whole, and each color filter sub-pattern 320 is of a centrosymmetric shape as a whole. As a result, during the manufacture of the display substrate, the precursor resin for forming the first color filter unit 330 will have an increased contact area with the base substrate 2 at the right end of the patterned region 3, the precursor resin for forming the third color filter unit 350 will have an increased contact area with the base substrate 2 at the left end of the patterned region 3, and the precursor resin for forming the second color filter unit 350 will have an increased contact area with the base substrate 2 at the right end and the left end of the patterned region 3.

Figure 6A:
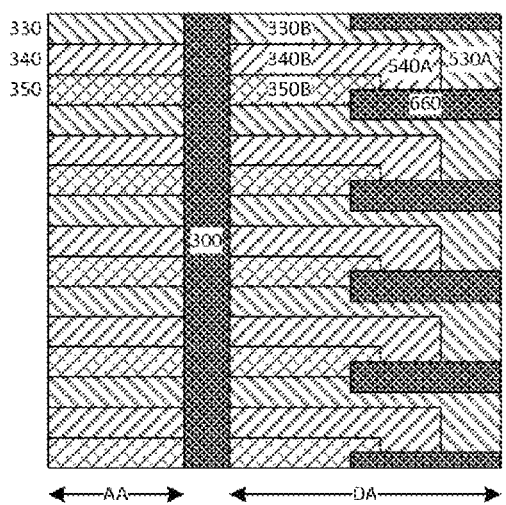
FIGS. 6A and 6B are partial enlarged views of the display substrate according to some embodiments of the present disclosure.
Figure 6B:
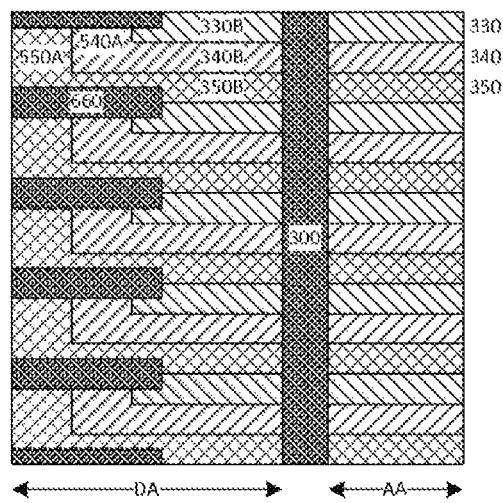

FIGS. 6A and 6B illustratively show the peripheral regions 5, 6 of the patterned region 3 on the display substrate 1, as modified versions of those in FIGS. 5A and 5B respectively. Different from FIGS. 5A and 5B, in FIGS. 6A and 6B, at the non-display region DA, the display substrate 1 further includes auxiliary black matrix patterns 660 each arranged between adjacent color filter sub-patterns 320. As shown in FIG. 6A, at the right end of the patterned region 3, the anchoring portion 530A of the first color filter unit 330, the anchoring portion 540A of the second color filter unit 340 and an end portion of the third color filter unit 350 partially overlap the auxiliary black matrix pattern 660. As shown in FIG. 6B, at the left end of the patterned region 3, an end portion of the first color filter unit 330, the anchoring portion 540A of the second color filter unit 340 and the anchoring portion 550A of the third color filter unit 350 partially overlap the auxiliary black matrix pattern 660. When the adhesion level between the auxiliary black matrix pattern 660 and each of the color filter unit and the base substrate is sufficiently high, the adhesion level between the end of the color filter unit and the base substrate will be increased, thereby to prevent the precursor resin from being removed from the base substrate.

Figure 7A:
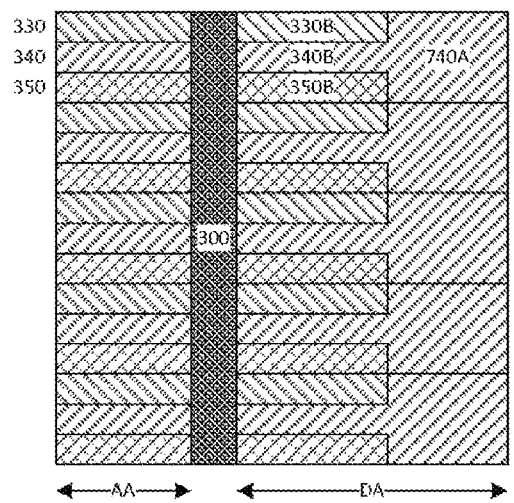
FIGS. 7A, 7B and 7C are partial enlarged views of the display substrate according to some embodiments of the present disclosure.

FIG. 7A illustratively shows the peripheral region 5 of the patterned region 3 on the display substrate 1. As shown in FIG. 7A, at the non-display region DA, the second color filter unit 340 includes an anchoring portion 740A. For example, in the direction perpendicular to the extension direction of the body portion 340B, the anchoring portion 740A may extend to boundaries each between the color filter sub-pattern 320 where the second color filter unit 340 is located and one of the two adjacent color filter sub-patterns 320. In a possible embodiment of the present disclosure, in the direction perpendicular to the extension direction of the body portion 340B, the anchoring portion 740 has a width equal to a sum of the widths of the body portions 330B, 340B and 350B.

Figure 7B:
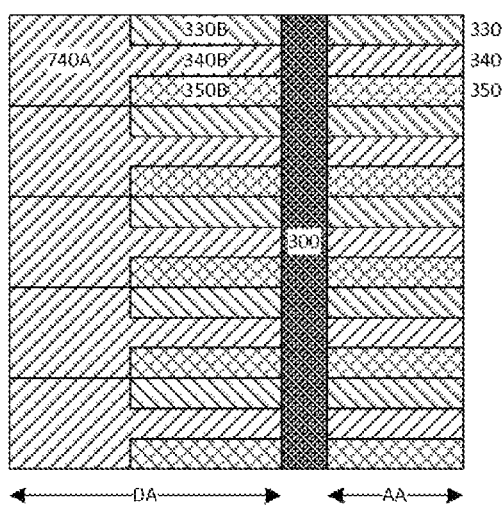

FIG. 7B illustratively shows the peripheral region 6 of the patterned region 3 on the display substrate 1. Similar to FIG. 7A, as shown in FIG. 7B, at the non-display region DA, the second color filter unit 340 includes the anchoring portion 740A.

In the examples of FIGS. 7A and 7B, for each color filter sub-pattern 320, the second color filter unit 340 is of a T shape at each of the left end and the right end. As a result, during the manufacture of the display substrate, the precursor resin for forming the second color filter unit 340 will have an increased contact area with the base substrate 2 at the left end and the right end of the patterned region 3.

Figure 7C:
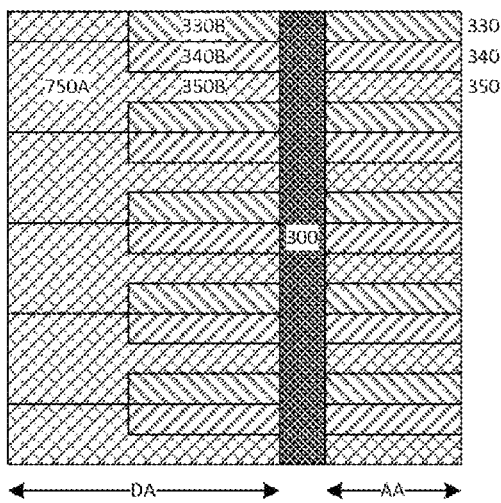

FIG. 7C illustratively shows the peripheral region 6 of the patterned region 3 on the display substrate 1. As shown in FIG. 7C, at the non-display region DA, the third color filter unit 350 includes an anchoring portion 750A.

In the examples of FIGS. 7A and 7C, for each color filter sub-pattern 320, the second color filter unit 340 is of a T shape at the right end, and the third color filter unit 350 is of a T shape at the left end. As a result, during the manufacture of the display substrate, the precursor resin for forming the second color filter unit 340 will have an increased contact area with the base substrate 2 at the right end of the patterned region 3, and the precursor resin for forming the third color filter unit 350 will have an increased contact area with the base substrate 2 at the left end of the patterned region 3.

Figure 8A:
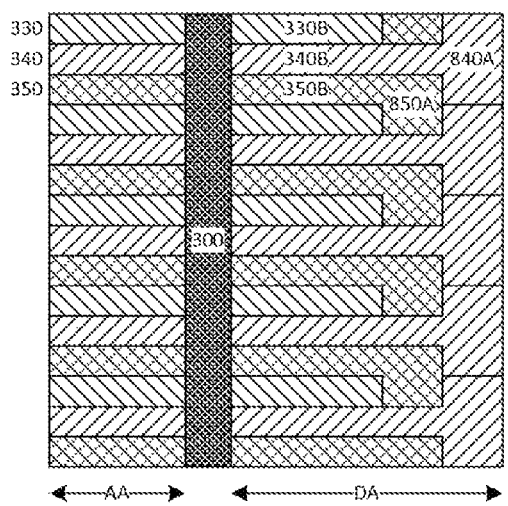
FIGS. 8A, 8B and 8C are partial enlarged views of the display substrate according to some embodiments of the present disclosure.

FIG. 8A illustratively shows the peripheral region 5 of the patterned region 3 on the display substrate 1. As shown in FIG. 8A, at the non-display region DA, the second color filter unit 340 includes an anchoring portion 840A. For example, in the direction perpendicular to the body portion 340B, the anchoring portion 840A may extend to boundaries each between the color filter sub-pattern 420 where the second color filter unit 340 is located and one of the two adjacent color filter sub-patterns 320. In addition, the third color filter unit 350 includes an anchoring portion 850A. For example, in the direction perpendicular to the body portion 350B, the anchoring portion 850A may extend to the body portion 340B of the second color filter unit 340 in an adjacent color filter sub-pattern 320.

In a possible embodiment of the present disclosure, in the direction perpendicular to the body portion 340B, the anchoring portion 840A has a width equal to a sum of the widths of the body portions 330B, 340B and 350B, and the anchoring portion 850A has a width equal to a sum of the widths of the body portions 330B and 350B. In a possible embodiment of the present disclosure, in the extension direction of the body portions 340B and 350B, the anchoring portion 840A has a length equal to the anchoring portion 850A.

Figure 8B:
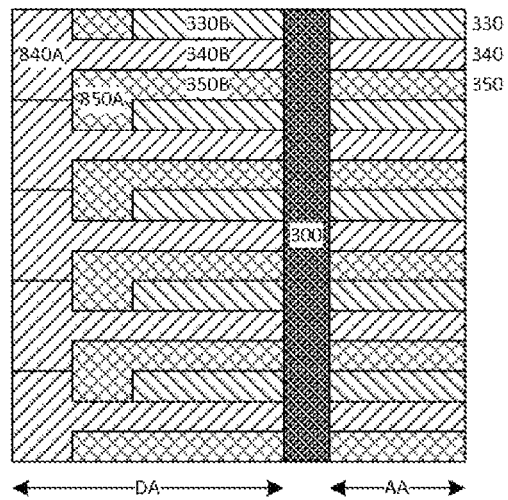

FIG. 8B illustratively shows the peripheral region 6 of the patterned region 3 on the display substrate 1. Similar to FIG. 8A, as shown in FIG. 8B, at the non-display region DA, the second color filter unit 340 includes the anchoring portion 840A, and the third color filter unit 350 includes the anchoring portion 850A.

In FIGS. 8A and 8B, the second color filter unit 340 is of a T shape at each of the left end and the right end, and the two T shapes are axisymmetric with each other. In addition, the third color filter unit 350 is of an L shape at each of the left end and the right end, and the two L shapes are axisymmetric with each other. As a result, during the manufacture of the display substrate, the precursor resin for forming the second color filter unit 340 and the third color filter unit 350 will have an increased contact area with the base substrate 2 at the left end and the right end of the patterned region 3.

Figure 8C:
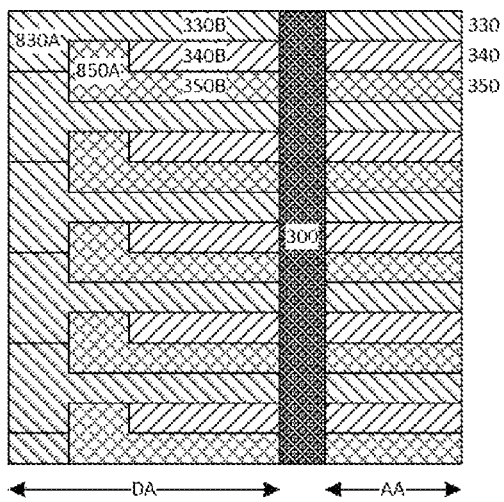

FIG. 8C illustratively shows the peripheral region 6 of the patterned region 3 on the display substrate 1, as a modified version of that in FIG. 8B. As shown in FIG. 8C, at the non-display region DA, the first color filter unit 330 includes an anchoring portion 830A, and the third color filter unit 350 includes the anchoring portion 850A.

In FIGS. 8A and 8C, the first color filter unit 330 is of a T shape at the left end, the second color filter unit 340 is of a T shape at the right end, and the two T shapes are centrosymmetric with each other. In addition, the second color filter unit 340 is of an L shape at each of the left end and the right end, and the two L shapes are centrosymmetric with each other. As a result, during the manufacture of the display substrate, the precursor resin for forming the first color filter unit 330 will have an increased contact area with the base substrate 2 at the left end of the patterned region 3, the precursor resin for forming the second color filter unit 340 will have an increased contact area with the base substrate 2 at the right end of the patterned region 3, and the precursor resin for forming the third color filter unit 350 will have an increased contact area with the base substrate 2 at the left end and the right end of the patterned region 3.

Figure 9:
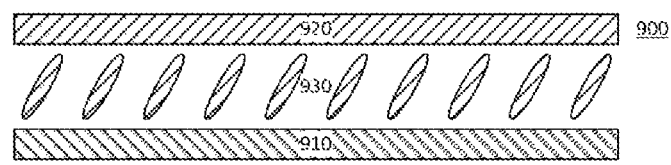
FIG. 9 is a schematic view showing the display substrate according to some embodiments of the present disclosure.

The present disclosure also provides in some embodiments a display device. Taking an LCD as an example, as shown in FIG. 9, the display device 900 includes a display substrate 910, an opposed substrate 920, and a liquid crystal layer 930 arranged therebetween. For example, the display substrate 910 may be the display substrate mentioned hereinabove. It should be noted that, apart from the LCD, the above-mentioned display substrate may also be applied to an OLED display device. The display device may be a product or member having a display function, e.g., electronic paper, mobile phone, flat-panel computer, television, display, laptop computer, digital photo frame or navigator.

Figure 10A:
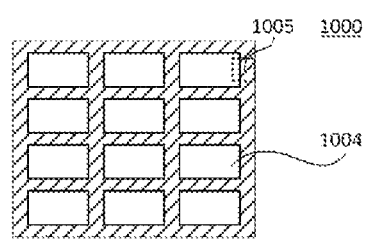
FIGS. 10A and 10B are schematic view showing a mask according to some embodiments of the present disclosure.

The present disclosure further provides in some embodiments a mask for forming a color filter pattern of a display substrate. As shown in FIG. 10A, the mask 1000 is adopted to form the patterned region 3 of the display substrate 1 in FIG. 1. The mask 1000 includes a plurality of panel exposure regions 1004 corresponding to the panel regions 4 of the patterned region 3 in FIG. 1.

Figure 10B:
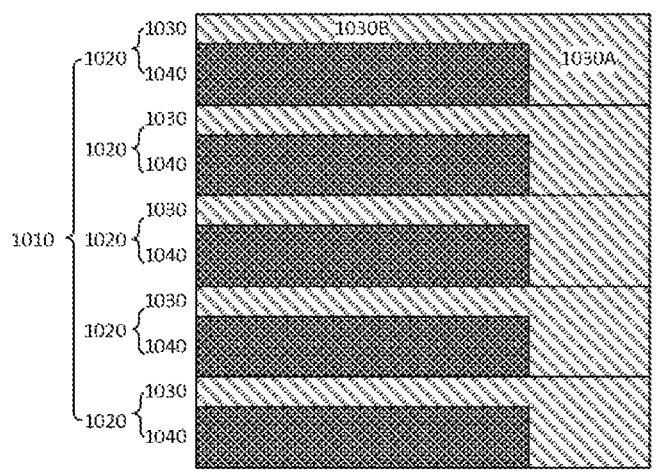

FIG. 10B shows a peripheral region 1005 of the mask 1000. Here, the peripheral region 1005 refers to an end region of the mask 1000. Specifically, the mask 1000 in FIG. 10B is adopted to form the first color filter unit 330 of the display substrate in FIG. 3A. As shown in FIG. 10B, the mask 1000 includes an exposure pattern 1010. The exposure pattern 1010 includes a plurality of exposure sub-patterns 1020, and each exposure sub-pattern 1020 includes a first exposure unit 1030 and a second exposure unit 1040 adjacent to each other. A shape of the first exposure unit 1030 is the same as that of the first color filter unit 330 in FIG. 3A, and a shape of the second exposure unit 1040 is the same as that of a combination of the second color filter unit 340 and the third color filter unit 350 in FIG. 3A.

As shown in FIG. 10B, the first exposure unit 1030 includes a body portion 1030B and an anchoring portion 1030A. A shape of the body portion 1030B is the same as that of a combination of the portion of the first color filter unit 330 at the display region AA and the portion of the first color filter unit 330 at the non-display region DA in FIG. 3A, and a shape of the anchoring portion 1030A is the same as that of the anchoring portion 330A of the first color filter unit 330 at the non-display region DA in FIG. 3A.

During the manufacture of the display device, after the precursor resin for the first color filter unit 330 has been applied onto the base substrate, the precursor resin may be exposed and developed through the mask 1000, so as to form the first color filter unit 330 of the display substrate in FIG. 3A. Then, the above application, exposure and development processes may be repeated through another two masks having exposure patterns of the same shape as the second color filter unit 340 and the third color filter unit 350 respectively, so as to form the second color filter unit 340 and the third color filter unit 350 in FIG. 3A.

The above description on the shapes of the first color filter unit, the second color filter unit and the third color filter units may also be applied to the description on the shapes of the exposure units of the mask, i.e., the mask in the present disclosure has the same or similar embodiments as the above-mentioned display substrate, with the same or similar beneficial effect.

The present disclosure further provides in some embodiments a method for manufacturing a display substrate. Taking the RGB color filter units as an example, the manufacturing method of a display substrate includes: forming a black matrix layer on a base substrate, and patterning the black matrix layer so as to form a black matrix pattern; applying red precursor resin onto the base substrate, and patterning the red precursor resin through a mask, so as to form a red color filter unit; applying green precursor resin onto the base substrate, and patterning the green precursor resin through a mask, so as to form a green color filter unit; and applying the blue precursor resin onto the base substrate, and patterning the blue precursor resin through a mask, so as to form a blue color filter unit. In the embodiments of the present disclosure, the red, green and blue precursor resin is patterned through the mask, so as to acquire the display substrate described with reference to FIGS. 3A to 8C.

In other words, the manufacture method of the display substrate in the present disclosure has the same or similar embodiments as the above-mentioned display substrate, with the same or similar beneficial effects.

The embodiments of the present disclosure provide a display substrate, a manufacturing method thereof, a display device and a mask. The display substrate includes the base substrate, and the black matrix pattern and the color filter pattern on the base substrate. The black matrix pattern defines the one or more display regions of the display substrate and the non-display region surrounding the one or more display regions. The color filter pattern includes the plurality of color filter sub-patterns, each color filter sub-pattern includes the plurality of color filter units, and each color filter unit includes the body portion. In addition, at least one of the color filter units at the non-display region includes the anchoring portion extending from the body portion, and in the direction perpendicular to the extension direction of the body portion, the anchoring portion has a size greater than the body portion. As a result, the precursor resin will have an increased contact area with the base substrate or the black matrix pattern at the peripheral region DA, the adhesion level between the precursor resin and the base substrate or the black matrix pattern will be increased, and prevent the precursor resin from being easily removed when subjected to an air knife after the developing process, thereby to prevent the occurrence of various defects caused by the removal of the precursor resin.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate, comprising a base substrate, and a black matrix pattern and a color filter pattern arranged on the base substrate, wherein the black matrix pattern defines one or more display regions of the display substrate, and a non-display region surrounding the one or more display regions;
    the color filter pattern comprises a plurality of color filter sub-patterns, each color filter sub-pattern comprises a plurality of color filter units, and each color filter unit comprises a body portion;
    at least one of the color filter units further comprises an anchoring portion extending from the body portion, and the anchoring portion has a width greater than the body portion in a direction perpendicular to an extension direction of the body portion;
    wherein the body portion of each color filter unit at the non-display region is of a strip-like shape;
    wherein at an end region of each color filter sub-pattern, the anchoring portion of the at least one color filter unit extends in the direction perpendicular to the extension direction of the body portion toward a boundary between the color filter sub-pattern where the at least one color filter unit is located and at least one adjacent color filter sub-pattern;
    wherein each color filter sub-pattern comprises a first color filter unit, a second color filter unit, and a third color filter unit arranged adjacent to each other sequentially; and
    wherein at the end portion of each color filter sub-pattern, the first color filter unit comprises an anchoring portion.

2. The display substrate according to claim 1, wherein at the end region of each color filter sub-pattern, the anchoring portion of the first color filter unit extends to a boundary between the color filter sub-pattern where the first color filter unit is located and an adjacent color filter sub-pattern away from the first color filter unit.

3. The display substrate according to claim 2, wherein at the end region of each color filter sub-pattern, the second color filter unit comprises an anchoring portion which extends to a boundary between the color filter sub-pattern where the first color filter unit is located and an adjacent color filter sub-pattern away from the first color filter unit.

4. The display substrate according to claim 3, wherein in the direction perpendicular to the extension direction of the body portion of the first color filter unit, the anchoring portion of the first color filter unit has a width equal to a sum of a width of the body portion of the first color filter unit, a width of the body portion of the second color filter unit and a width of the body portion of the third color filter unit.

5. The display substrate according to claim 4, wherein in the direction perpendicular to the extension direction of the body portion of the first color filter unit, the anchoring portion of the second color filter unit has a width equal to a width of the body portion of the second color filter unit and a width of the body portion of the third color filter unit.

6. The display substrate according to claim 3, wherein in the extension direction of the body portion of the first color filter unit, the anchoring portion of the first color filter unit has a length equal to the anchoring portion of the second color filter unit.

7. The display substrate according to claim 3, further comprising auxiliary black matrix patterns arranged at the non-display region and between adjacent color filter sub-patterns, wherein the auxiliary black matrix pattern overlaps the anchoring portion of the first color filter unit, the anchoring portion of the second color filter unit, and an end of the third color filter unit.

8. The display substrate according to claim 1, wherein at the end region of each color filter sub-pattern, the third color filter unit comprises the anchoring portion, and the anchoring portion of the first color filter unit and the anchoring portion of the third color filter unit extend in opposite directions and meet at an end region of the second color filter unit.

9. The display substrate according to claim 8, wherein in a direction perpendicular to an extension direction of the body portion of the first color filter unit, the anchoring portion of the first color filter unit has a width equal to a sum of a width of the body portion of the first color filter unit and a half of a width of the body portion of the second color filter unit, and the anchoring portion of the third color filter unit has a width equal to a sum of a width of the body portion of the third color filter unit and a half of the width of the body portion of the second color filter unit.

10. The display substrate according to claim 1, wherein at the end region of each color filter sub-pattern, the second color filter unit comprises an anchoring portion which extends in the direction perpendicular to the extension portion of the body portion of the second color filter unit to boundaries between the color filter sub-pattern where the second color filter unit is located and each of two adjacent color filter sub-patterns.

11. The display substrate according to claim 10, wherein at the end region of each color filter sub-pattern, the third color filter unit comprises an anchoring portion which extends in the direction perpendicular to the extension direction of the body portion of the third color filter unit to the body portion of the second color filter unit of an adjacent color filter sub-pattern.

12. The display substrate according to claim 1, wherein each color filter sub-pattern is of a centrosymmetric shape.

13. The display substrate according to claim 1, wherein each color filter sub-pattern is of an axisymmetric shape.

14. A display device, comprising the display substrate according to claim 1.

15. A mask for manufacturing a color filter pattern in a display substrate, wherein an exposure pattern of the mask comprises a plurality of exposure sub-patterns, and each exposure sub-pattern comprises at least one exposure pattern units, each exposure pattern unit comprises a body portion and an anchoring portion at an end of the mask, and the anchoring portion has a size greater than that of the body portion in a direction perpendicular to an extension direction of the body portion;
- wherein the body portion of each exposure pattern unit at a non-display region is of a strip-like shape;
- wherein at an end region of each exposure sub-pattern, the anchoring portion of the at least one exposure pattern unit extends in the direction perpendicular to the extension direction of the body portion toward a boundary between the exposure sub-pattern where the at least one exposure pattern unit is located and at least one adjacent exposure sub-pattern;
- wherein each exposure sub-pattern comprises a first exposure pattern unit, a second exposure pattern unit, and a third exposure pattern unit arranged adjacent to each other sequentially;
- wherein at the end portion of each exposure sub-pattern, the first exposure pattern unit comprises an anchoring portion.

16. A method for manufacturing a display substrate, comprising:
- applying precursor resin onto a base substrate, and
- patterning the precursor resin through the mask according to claim 15, so as to form color filter units.

17. A display substrate, comprising a base substrate, and a black matrix pattern and a color filter pattern arranged on the base substrate, wherein the black matrix pattern defines one or more display regions of the display substrate, and a non-display region surrounding the one or more display regions;
- the color filter pattern comprises a plurality of color filter sub-patterns, each color filter sub-pattern comprises a plurality of color filter units, and each color filter unit comprises a body portion;
- at least one of the color filter units further comprises an anchoring portion extending from the body portion, and the anchoring portion has a width greater than the body portion in a direction perpendicular to an extension direction of the body portion;
- wherein the body portion of each color filter unit at the non-display region is of a strip-like shape;
- wherein at an end region of each color filter sub-pattern, the anchoring portion of the at least one color filter unit extends in the direction perpendicular to the extension direction of the body portion toward a boundary between the color filter sub-pattern where the at least one color filter unit is located and at least one adjacent color filter sub-pattern;
- wherein each color filter sub-pattern comprises a first color filter unit, a second color filter unit, and a third color filter unit arranged adjacent to each other sequentially;
- wherein at the end region of each color filter sub-pattern, the second color filter unit comprises an anchoring portion which extends in the direction perpendicular to the extension portion of the body portion of the second color filter unit to boundaries between the color filter sub-pattern where the second color filter unit is located and each of two adjacent color filter sub-patterns.

18. The display substrate according to claim 17, wherein at the end region of each color filter sub-pattern, the third color filter unit comprises an anchoring portion which extends in the direction perpendicular to the extension direction of the body portion of the third color filter unit to the body portion of the second color filter unit of an adjacent color filter sub-pattern.

* * * * *